United States Patent
Wang et al.

(10) Patent No.: US 8,005,008 B2
(45) Date of Patent: Aug. 23, 2011

(54) METHOD FOR SUPPORTING A NETWORK LOCATING A TARGET NODE

(75) Inventors: Hong Wang, Beijing (CN); Huarui Liang, Beijing (CN); Lixiang Xu, Beijing (CN)

(73) Assignees: Samsung Electronics Co., Ltd. (KR); Beijing Samsung Telecom R&D Center (CN)

( * ) Notice: Subject to any disclaimer, the term of this patent is extended or adjusted under 35 U.S.C. 154(b) by 130 days.

(21) Appl. No.: 12/562,544

(22) Filed: Sep. 18, 2009

(65) Prior Publication Data

US 2010/0074129 A1    Mar. 25, 2010

(30) Foreign Application Priority Data

Sep. 19, 2008  (CN) .......................... 2008 1 0165635

(51) Int. Cl.
*H04J 1/16* (2006.01)
(52) U.S. Cl. ........................................ 370/252; 455/423
(58) Field of Classification Search .................. 370/252, 370/328, 331; 455/423, 445, 404.2
See application file for complete search history.

(56) References Cited

U.S. PATENT DOCUMENTS

| 7,650,637 | B2 * | 1/2010 | Li et al. ........................... 726/15 |
| 2004/0147266 | A1 * | 7/2004 | Hwang et al. .................. 455/445 |
| 2007/0066298 | A1 * | 3/2007 | Hurst ............................. 455/423 |
| 2007/0213060 | A1 | 9/2007 | Shaheen |
| 2008/0181411 | A1 | 7/2008 | Norrman et al. |
| 2008/0192697 | A1 | 8/2008 | Shaheen |
| 2009/0262682 | A1 * | 10/2009 | Khetawat et al. ............. 370/328 |
| 2009/0262703 | A1 * | 10/2009 | Khetawat et al. ............. 370/331 |
| 2009/0264095 | A1 * | 10/2009 | Khetawat et al. .......... 455/404.2 |

FOREIGN PATENT DOCUMENTS

EP    1 928 133    6/2008

* cited by examiner

*Primary Examiner* — Thong Vu
(74) *Attorney, Agent, or Firm* — The Farrell Law Firm, P.C.

(57) ABSTRACT

The supporting of a network locating a target node is disclosed. The supporting of a network locating a target node includes a User Equipment (UE) transmitting a measurement report message to a source evolved Node B (eNB), the measurement report message including a measurement result of signal quality of a target eNB; the source eNB transmitting a message to a core network node, the message including a type of the target eNB; if the target eNB is a Home Node B (HNB), the core network node transmitting a switching message to a target eNB GateWay (GW) or the target eNB. The Mobility Management Entity (MME) can determine whether the UE is allowed to access the target HNB, and the MME can locate the proper HNB GW.

7 Claims, 5 Drawing Sheets

METHOD FOR SUPPORTING A NETWORK LOCATING A TARGET NODE

PRIORITY

The present application claims priority under 35 U.S.C. §119 to a Chinese Patent Application filed in the Chinese Intellectual Property Office on Sep. 19, 2008 and assigned Serial No. 200810165635.1, the contents of which are incorporated herein by reference.

BACKGROUND OF THE INVENTION

1. Field of the Invention

The present invention generally relates to a communication system, and more particularly, to a method of indicating a type of a target evolved Node B (eNB) to a core network so that the core network can locate a proper gateway and control a user.

2. Description of the Related Art

A system structure of a System Architecture Evolution (SAE) is illustrated in FIG. 1.

User Equipment (UE) 101 is a terminal device for receiving data. Evolved Universal Mobile Telecommunications System (UMTS) Terrestrial Radio Access Network (EU-TRAN) 102, also referred to as an eNB, is a radio access network of an Long Term Evolution (LTE) SAE, for providing an interface through which an LTE mobile device may access the radio network. EUTRAN 102 is connected to a Mobility Management Entity (MME) 103 and a user plane entity Serving Gateway 104 through the interface S1. MME 103 is for managing UE's mobile context, session context, and storing the user information on security. Serving Gateway 104 primarily provides a function of a user plane. The interface S1-MME is for establishing a radio access bearer for the UE 101, and forwarding messages from UE 101 to MME 103 through a wireless access network.

The combined function of MME 103 and Serving Gateway 104 is similar to that of an original General Packet Radio Service (GPRS (SGSN Supporting Node) 106. It is possible that both MME 103 and Serving Gateway 104 could be located in the same physical entity. PDN Gateway 105 is for performing the functions such as accounting, legally monitoring, etc. It is possible that both the Serving Gateway 104 and the PDN Gateway 105 could be located in the same physical entity. SGSN 106 provides routing for data transmission in an existing UMTS. The existing SGSN 106 finds corresponding Gateway GPRS Supporting Nodes (GGSN) according to an Access Point Name (APN). HSS 107 is a home subscription sub-system of the UE 101, for storing user information such as the UE's 101 current location, the serving node's address, user's security related information, UE's 101 active Packet Data Protocol (PDP) context, and so on. PCRF 108 provides a Quality of Service (QoS) policy and accounting rules through the interface S7.

In general, the user data stream reaches the Serving Gateway 104 through PDN Gateway 105. Then, through the GPRS Tunnel Protocol (GTP) channel, data is sent by the Serving Gateway 104 to the eNB in which the UE 101 is located, and then sent by the eNB to corresponding UE 101.

Evolved Packet Core (EPC) is an LTE core network. In this case, each eNB is connected to several MMEs in an MME pool. Each eNB is connected to several Serving GateWays S-GWs in S-GW pool. The interface between eNBs is referred to as an X2.

In an enhanced network architecture, a new eNB, i.e., HeNB, is defined. HeNB refers to a Node B applied in a home. It also can be applied in sites such as a university, a company and so on. An HeNB is a Plug-and-Play device. The difference between an HeNB and a common macro eNB lies in that usually not all UEs can access the HeNB. For example, only the UEs in a user's home or the ones authorized to access the HeNB can access the corresponding HeNB.

For the HeNB in a company, only the company's staff and authorized partners can access the HeNB. The HeNB group (e.g., the HeNB in a company) bearing the same access subscriber cluster is referred to as a Closed Subscriber Group (CSG). In an HeNB system, each CSG has a unique IDentifier (ID) for identifying the CSG. This ID can be broadcast through the broadcast channel. The CSG ID is included in Common Gateway Interface (CGI) (cell unique ID).

For example, all HeNBs can be divided into three categories, that is, the eNB in a home, the eNB in a small corporation, and the eNB in large corporation. The CGI is made up of 28 bits in total. If the HeNB is an eNB in a home, the first 27 bits in the CGI indicates the CSG ID, and the last bit indicates that the HeNB is an eNB in a home. If the HeNB is an eNB in a small corporation, the first 24 bits in CGI indicates the CSG ID, the last two bits indicate that the corporation is small-scaled, and the remaining two bits stand for the eNB. In a home, one eNB corresponds to one CSG with unique CSG ID. While in a corporation, a plurality of eNB s can simultaneously correspond to one CSG. Therefore, the same CSG ID is broadcast by a plurality of eNodeBs. An HeNB can be connected to the HeNB gateway, and the HeNB gateway is connected to the core network.

A UE can access a plurality of CSGs. The IDs of these CSGs form a CSG white list of the UE. The UE restores its white list. In addition, the core network or the operation and maintenance center should know the UE's white list.

In the following description, an HeNB is referred to as Home Node B (HNB), including the home station deployed in the enhanced systems. An HNB gateway is referred to as GW or HNB GW.

Conventionally, when a UE moves between macro cells, the UE sends a measurement report to the source cell, including measurement results on signal quality for a group of adjacent cells. According to the measurement report, the source cell determines to switch the UE to the cell with better signal quality. If no interface X2 exists between the source cell and the target cell, the switch is implemented through interface S1. The switch processing implemented through interface S1 is illustrated in FIG. 2.

In step 201, the UE sends the measurement report message to the source eNB, including scrambled codes applied in the target cell step 202, according to the measurement report message, the source eNB determines to switch the UE to an adjacent cell with better signal quality. The adjacent cell is a macro cell. The source eNB sends a switching requirement message to MME, including an eNB UE SLAP ID allocated by eNB to the UE, a target macro eNB ID, and packets transparently transferred from the source eNB to the target eNB. The target macro eNB ID is included in the CGI. According to the information included in the measurement report in step 201, the source eNB can obtain the target eNB ID. In step 203, by the target macro eNB ID included in the message in step 202, MME locates the target eNB and then sends a switching request message to the target eNB, including the MME UE S1AP ID allocated to UE by the MME, information on the to-be-established SAE bearer such as an SAE bearer ID, a transmission layer address and QoS information. The message further includes the packets transparently transferred from the source eNB to the target eNB. In step 204, the target eNB prepares resources and sends a switching request response message to MME, including information on the SAE bearers that can be established, information on the SAE bearers that can not be established, and the packets transparently transferred from the target eNB to the source eNB. In step 205, the MME sends a switching command message to the source eNB, including information on the SAE bearers that can be established, information on the SAE bearers that can not be established, and packets transparently transferred from the target eNB to the source eNB. In step 206, the source eNB sends a channel reconfiguration request message to the UE. In step 207, UE sends a channel reconfiguration response message to the target eNB. In step 208, the target eNB sends a switching notification message to the source MME. In step 209, MME sends a UE context release command message to the source eNB. In step 210, the source eNB sends a UE context release complete message to the MME.

According to previous description, not all UEs can access the target cell if the target cell is an HNB. Therefore, it is preferable that the MME determine whether the UE is allowed to access the target eNB or not. If not, the MME can directly reject this switching.

In another aspect, if the target cell is an HNB that is connected to the core network through the GW, it is necessary for the MME to locate the corresponding GW according to the message of step 202.

As described above, in the conventional art, when the source eNB sends the switching requirement message to the MME, the source eNB does not include the type of the target Node, but only the target eNB ID in the message. Therefore the MME has no idea where the macro eNB or the HNB are switched. If the MME does not know the type of the target eNB, the MME can not implement subsequent operations according to the type of target eNB. For example, if the target eNB is an HNB, it is necessary for the MIME to locate the GW for the target eNB, and for a macro eNB, the MME can directly locate its position. In another aspect, if the MME knows that the target eNB is an HNB, the MME can act as an access controller for UE.

SUMMARY OF THE INVENTION

An object of this invention is to provide a method for a source eNB to inform a core network of a type of a target eNB, whereby the network can locate a proper gateway and control the UE.

To achieve the above object, a method of supporting a network locating a target node includes transmitting, by a User Equipment (UE), a measurement report message to a source evolved Node B (eNB), the measurement report message including a measurement result of a signal quality of a target eNB; transmitting, by the source eNB, a message to a core network node, the message including a type of the target eNB; and transmitting, by the core network node, a switching message to one of a target eNB GateWay (GW) and the target eNB, if the target eNB is an Home Node B (HNB).

With the method proposed herein, an MME can determine whether the UE is allowed to access the target HNB, and the MIME can locate the proper HNB GW.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE PREFERRED EMBODIMENTS

Hereinafter, exemplary embodiments of the present invention will be described with reference to the accompanying drawings. In the following description, various specific definitions found in the following description, such as specific elements, etc., are provided only to help in the general understanding of the present invention, and it will be apparent to those skilled in the art that the present invention can be implemented without such definitions. Further, in the following description of the present invention, a detailed description of known functions and configurations incorporated herein will be omitted when it may make the subject matter of the present invention rather unclear.

Figure 1:
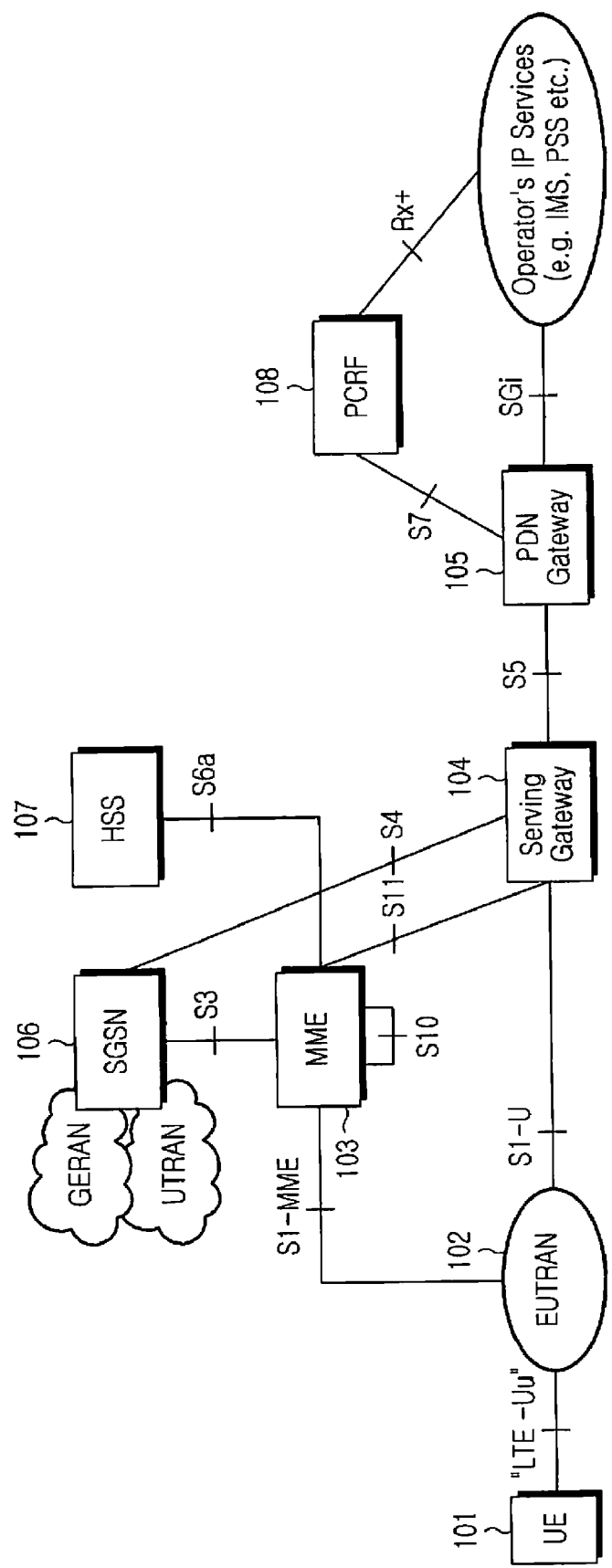
FIG. 1 is a diagram of a SAE network.
Figure 2:
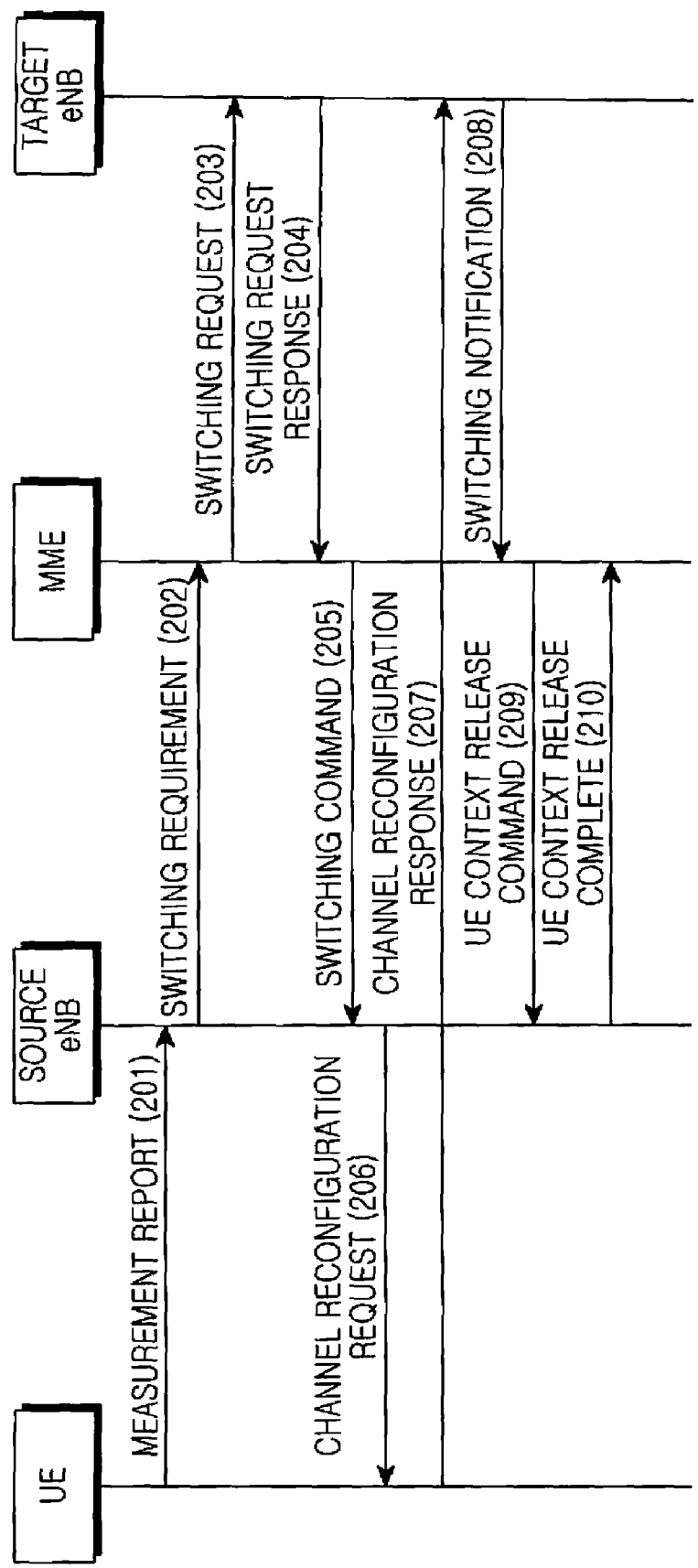
FIG. 2 is a block diagram of the conventional scheme.
Figure 3:
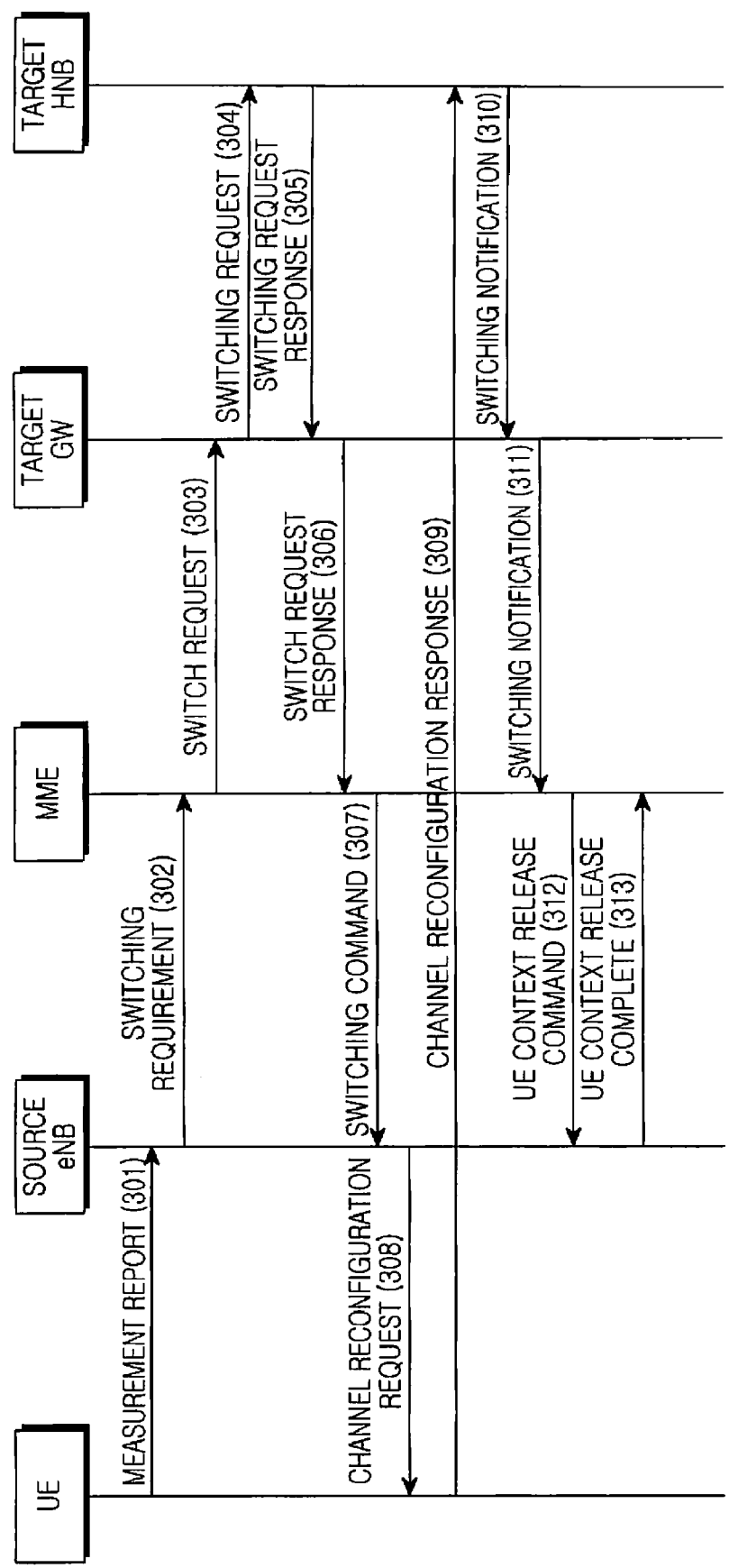
FIG. 3 is a flow diagram of an embodiment of the present invention.

An embodiment of the present invention is shown in FIG. 3. A description of the air-interface is omitted since the air-interface signaling is the same as that in the conventional art.

FIG. 3 is a flow diagram illustrating a UE in connection mode that moves from one eNB to another eNB: The eNB from which the UE is leaving is referred to as the source eNB. The source eNB can be either a macro eNB or a HNB. In this example, the source eNB is a macro eNB. The eNB to which the UE is moving to is referred as the target eNB. In this example, the target eNB is an HNB which is connected to the core network through the target GW.

In step 301, the UE sends a "measurement report" message to the source eNB, including the measurement result of signal quality of the target cell. The measurement report also includes the scrambled code applied in a physical layer of the target cell. According to this scrambled information, the source eNB can obtain a unique global ID (CGI) of the target cell. This step is the same as that in the conventional art.

If the HNB adopts specific scrambling code, the source eNB can determine whether the target cell is a home cell or not according to the scrambling code, or the UE determine about whether the target cell is an HNB according to the conventional art. When the UE sends the measurement report, the UE informs the macro cell of whether the target eNB is an HNB.

In step 302, according to the measurement report, the source eNB determines to switch the UE to a target cell with better signal quality. The source eNB sends the switching requirement message to the core network node (MME), including the eNB UE S1AP ID allocated to the UE by the source eNB, the MME UE S1AP ID allocated to the UE by the MME, the target ID, and the packets transparently transferred from the source eNB to the target eNB. In this message, the type of the target eNB can be included to indicate the type of the target eNB for the MME. According to the type of the target eNB and the target ID, the MME implements operations accordingly such as routing, locating a proper node, etc., to control the access of the UE. Different approaches can be adopted to indicate the type of the target eNB and the target ID.

One approach is to include a new information element type of target eNB in the switching requirement message to indicate whether the target eNB is an HNB. Another approach is to assign the type of target eNB with different values to indicate whether the target eNB is a macro eNB or an HNB. Only one bit is used. Meanwhile, if the target eNB is an HNB, the target ID is set as the CGI of the target cell. Another approach is that the source eNB sets the target ID as the ID of the GW corresponding to the target HNB if the target eNB is an HNB. From the point of view of the core network, the HNB GW is the same as the macro eNB, that is, they share the same ID length. In this message, a new information element type of the target eNB is included to indicate whether the target eNB is an HNB. The source eNB locates the target HNB GW through several approaches, such as that according to preset configuration, the source eNB calculates the ID of the target eNB GW based on the CGI of the target eNB or the target HNB's area information. In the alternative, the GW ID can be included in the CGI.

In step 303, the MME operates according to the type of the target eNB included in the message of step 302. The type of the target eNB is set as a macro cell. The MME locates the target eNB according to the target ID and sends the switching request message to the target eNB, the message includes the MME UE S1AP ID allocated to the UE by the MME, and information on the to-be-established SAE bearer such as the SAE bearer ID, the address of the transmission layer, QoS information, and the packets transparently transferred from the source eNB to the target eNB. If the type of the target eNB indicates that the target eNB is an HNB and the target ID is the CGI, then according to the present definition, the CGI includes the CSG ID.

The MME can learn about the CSG ID of the target eNB from the CGI. And also the MME has stored the CSG white list that the UE can access. This white list can be obtained from an operations and maintenance center. If the CSG ID is in the white list, the UE can directly access the target eNB to execute step 304; otherwise, the MME sends a switch preparation failure message to the source eNB. For routing, the GW ID can be included in the CGI. The GW ID shares the same length as a macro eNB, e.g., 20 bits.

The MME can obtain the GW ID to locate a corresponding GW from the CGI. However, since a plurality of HNBs locate within one GW, a 8-bit length GW ID is not enough to identify different HNBs, but it is enough for macro cells. Therefore, it may be specified that the GW ID is shorter than the macro eNB ID, e.g., a 10-bit length. With this fixed length of the ID and the CGI, the MME can obtain the GW ID and then locate the corresponding GW to which the message is transmitted. In the alternative, the GW ID is not included in the CGI, the corresponding relationship between CGI and GW can be stored in the MME. Then the MME can locate the corresponding GW with the CGI.

If the type of the target eNB indicates that the target eNB is an HNB and the target ID is the GW ID, it is necessary for the MME to obtain the CGI of the target eNB according to the packets transparently transferred from the source eNB to the target eNB. The CSG ID is included in the CGI. Therefore, the target CSG can be obtained according to the target CGI. According to the above approaches, it is determined whether the UE can access the target eNB. For routing, the MME can directly locate the GW, and then send the switching request message to the GW.

In step 304, the GW sends the switching request message to the target HNB. If no GW is deployed, no message is sent between the GW and the HNB. In step 305, the target HNB prepares resources and sends the switching request response message to the MME, the message including the information on the SAE bearer that can be established, the information on the SAE that can not be established, and the packets transparently transferred from the target eNB to the source eNB. IN step 306, the GW forwards the switching request response message to the MME. In step 307 the MME sends the switching command message to the source eNB, including the information on the SAE bearer that can be established, the information on the SAE that can not be established, and the packets transparently transferred from the target eNB to the source eNB. In step 308 the source eNB sends the channel reconfiguration request message to the UE. In step 309, the UE sends the channel reconfiguration response message to the target HNB. In step 310, the target HNB sends the switching notification message to the GW. In step 311, the GW forwards the switching notification message to the MME. In step 312, the MME sends the UE context release command message to the source eNB. In step 313, the source eNB sends the UE context release complete message to the MME.

Figure 4:
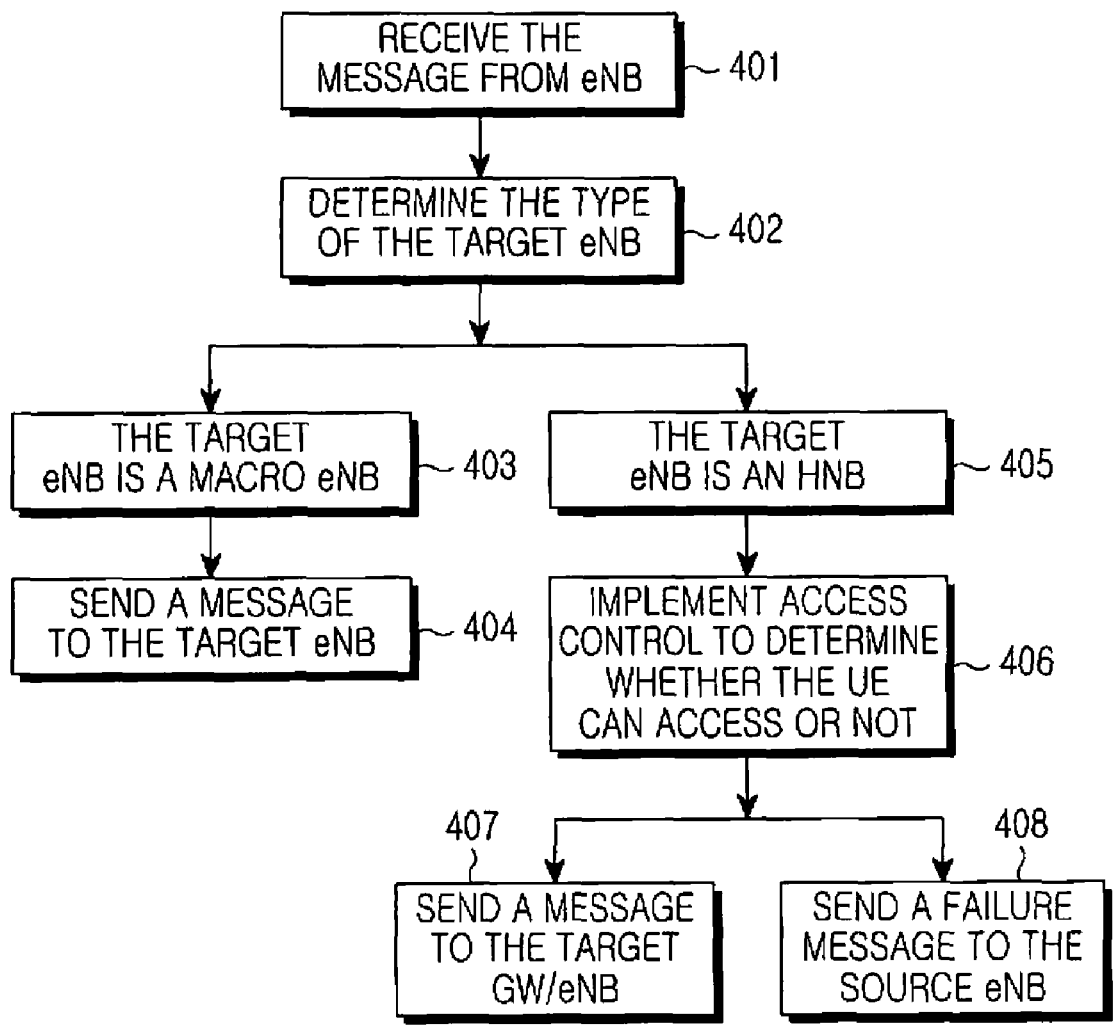
FIG. 4 is a flow diagram of the MME according to an embodiment of the present invention.

FIG. 4 is a flow diagram of a process implemented by the MME.

In step 401, the MME receives the message from the source eNB. In step 402, the MME determines the type of the target eNB. The MME determines the type of the target eNB according to the type of the target eNB in the received message, and the MME operates according to the type of the target eNB. If the target eNB is a macro eNB, the process goes to step 403. If the target eNB is an HNB, the process goes to step 405. In step 403, the target eNB is a macro eNB. In step 404, according to the target ID, the MME locates the target eNB and sends a message to the target eNB and proceeds as described in FIG. 3. In step 405, the target eNB is an HNB. In step 406, the MME determines the corresponding target HNB according to the target ID. If the target ID is a CGI, the eNB's CSG ID can be obtained from the CGI. MME needs to store the UE CSG white list. Since a UE can access several eNBs, i.e., can access several CSG, each UE has a CSG white list that it can access. This white list contains the IDs of all CSGs that the UE can access. The CSG white list is information related to the UE. The MME can obtain this list either from the operation and maintenance center, or the UE can send the white list to the MME via a non-access layer message and the MME saves the CSG white list.

Then, according to the stored CSG white list, the UE can access and obtain the CSG ID of the target eNB, and the MME determines whether to let the UE access the target HNB. If the target eNB's CSG ID is in the UE's CSG white list, the UE can access the target eNB and the process goes to step 407; otherwise, the process goes to step 408. If the target ID is the eNB GW ID, the MME can obtain the CGI of the target cell according to the packets transparently transferred from the source eNB to the target eNB. The target eNB's CSG ID can be obtained from the CGI. Then according to a comparison, the MME determines whether the UE can access the target eNB.

In step 407, the MME sends the switching request message to the target GW. If no GW is deployed, the message is directly sent to the target eNB. The subsequent procedure is the same as that set forth in FIG. 3. In step 408, the MME sends the switching preparation failure message to the source eNB.

Figure 5:
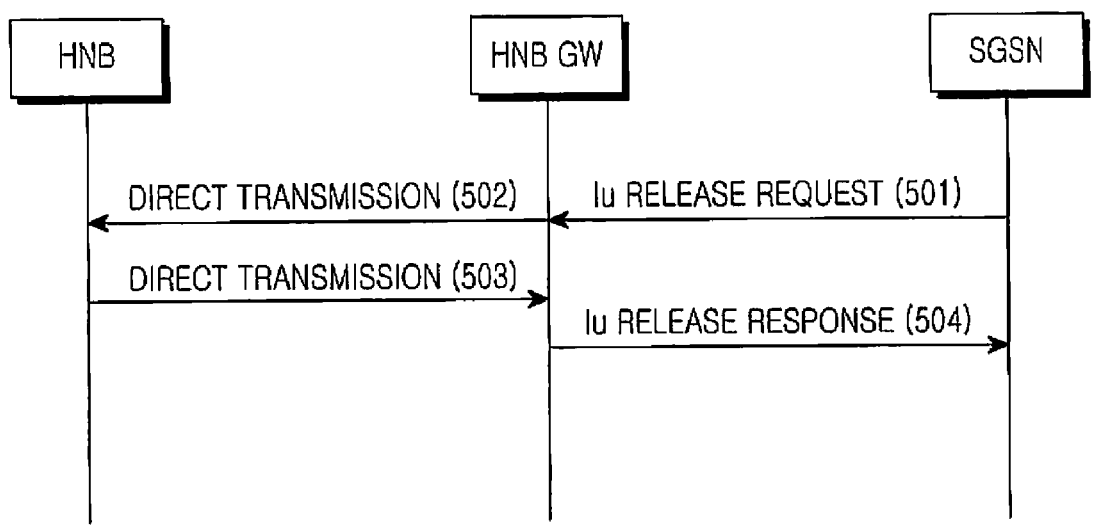
FIG. 5 is a flow diagram of an Iu release procedure according to an embodiment of the present invention.

FIG. 5 is a flow diagram of the Iu release procedure.

In step 501, the SGSN sends the Iu release REQUEST message to the HNB GW source eNB. In step 502, the HNB GW sends the Direct Transmission message to the HNB. In step 503, the HNB sends the Direct Transmission message to the HNB GW. And in step 504, the HNB GW sends the "Iu release RESPONSE" message to the SGSN.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A method of supporting a network locating a target node, comprising the steps of: transmitting, by a User Equipment (UE), a measurement report message to a source evolved Node B (eNB), the measurement report message including a measurement result of signal quality of a target eNB;

transmitting, by the source eNB, a message to a core network node, the message including a type of the target eNB; and transmitting, by the core network node, a switching message to one of a target eNB GateWay (GW) and the target eNB, if the target eNB is a Home Node B (HNB), wherein the message transmitted from the source eNB to the core network node includes an ID of the target eNB GW or the target eNB, wherein the ID of the target eNB GW or the target eNB is included in a target ID, and wherein a length of the ID of the target eNB GW is equal the length of a common macro eNB ID.

2. The method according to claim 1, wherein the measurement report includes a type of the target eNB.

3. The method according to claim 1, wherein the type of the target eNB indicates whether the target eNB is an HNB or a macro eNB.

4. The method according to claim 2, wherein the type of the target eNB indicates whether the target eNB is an HNB or a macro eNB.

5. The method according to claim 1, wherein the core network node stores a Closed Subscriber Group (CSG) white list of the UE.

6. The method according to claim 5, wherein the CSG white list of the UE is obtained from an operation and maintenance center.

7. The method according to claim 5, wherein the CSG white list of the UE is transmitted by the UE in a non-access layer message to the core network node.

* * * * *